United States Patent [19]
Barrett

[11] Patent Number: 5,852,746
[45] Date of Patent: Dec. 22, 1998

[54] SYSTEM FOR TRANSMITTING A MESSAGE USING STATUS BUTTON TO SYSTEM ADMINISTRATOR BY USING A SIGNAL COMPRISING PREDETERMINED NUMBER OF CHANGES EFFECTED OVER A PERIOD

[75] Inventor: Lorraine F. Barrett, Yorba Linda, Calif.

[73] Assignee: Canon Kabushiki Kaisha, Tokyo, Japan

[21] Appl. No.: 494,787

[22] Filed: Jun. 26, 1995

[51] Int. Cl.$^6$ ................................................ G06F 13/00
[52] U.S. Cl. .................... 595/837; 395/185.02; 395/887; 395/893
[58] Field of Search ............................ 364/242.94, 284.3, 364/395, 200.2, 200.09, 821

[56] References Cited

U.S. PATENT DOCUMENTS

| | | | |
|---|---|---|---|
| 3,905,025 | 9/1975 | Davis et al. .............................. | 395/732 |
| 4,237,535 | 12/1980 | Wiedenman ............................. | 395/870 |
| 4,503,499 | 3/1985 | Mason et al. ............................ | 395/671 |
| 4,872,186 | 10/1989 | Gerhart et al. .......................... | 375/369 |
| 4,922,491 | 5/1990 | Coale ...................................... | 395/183.02 |
| 5,121,113 | 6/1992 | Kedge et al. ............................ | 345/168 |
| 5,131,077 | 7/1992 | Indei ....................................... | 395/113 |
| 5,237,693 | 8/1993 | Kiyohara et al. ....................... | 395/725 |
| 5,305,055 | 4/1994 | Ebner et al. ............................. | 355/200 |
| 5,325,156 | 6/1994 | Ulinski .................................... | 355/209 |
| 5,414,494 | 5/1995 | Aiken et al. ............................. | 355/202 |
| 5,434,650 | 7/1995 | Nakahara et al. ...................... | 355/202 |
| 5,438,528 | 8/1995 | Emerson et al. ....................... | 364/580 |
| 5,491,796 | 2/1996 | Wanderer et al. ................. | 395/200.09 |
| 5,603,060 | 2/1997 | Weinberger et al. ...................... | 399/8 |

*Primary Examiner*—Thomas C. Lee
*Assistant Examiner*—Anderson I. Chen
*Attorney, Agent, or Firm*—Fitzpatrick, Cella, Harper & Scinto

[57] ABSTRACT

A method of transmitting a message to a system administrator of a local area network (LAN) from a front panel of a peripheral device which is interfaced to the LAN via a network interface device having a storage device. A signal representing a message to the system administrator is input on the front panel of the peripheral device and is transmitted to a network interface device. The input signal is detected at the network interface device and, in response to the detection, destination information for messages to the system administrator is retrieved from the storage device. A notification packet is then formed which includes the retrieved destination information, identification information regarding the peripheral device, and the message represented by the input signal, and the notification packet is transmitted to the system administrator using the retrieved destination information.

39 Claims, 9 Drawing Sheets

SYSTEM FOR TRANSMITTING A MESSAGE USING STATUS BUTTON TO SYSTEM ADMINISTRATOR BY USING A SIGNAL COMPRISING PREDETERMINED NUMBER OF CHANGES EFFECTED OVER A PERIOD

BACKGROUND OF THE INVENTION

1. Field of the Invention

The present invention relates to a method of transmitting a message from a peripheral to a system administrator and, more particularly, to a method of transmitting a help request to the system administrator from a front panel of the peripheral.

2. Description of the Related Art

Computerized local area networks (LAN's) are in widespread use for interconnecting many different computers and peripherals so as to allow users of the computers to communicate with one another and also to allow those users shared access to the peripherals. Recent developments in LAN's have seen the introduction of so-called "heterogeneous" LAN's, i.e., LAN's on which many different communication protocols are carried on a single Ethernet or Token-Ring medium. Examples of different protocols are IPX, which is typically used by DOS-based PC's, UDP/IP, which is typically used by UNIX-based workstations, and DDP, which is typically used by Macintosh computers. Each type of computer or workstation can be adapted through software to communicate using multiple different protocols.

A peripheral also can include software, i.e., multiple protocol stack modules, which allows the peripheral to communicate using multiple protocols in order to be shared on a heterogeneous LAN. A protocol stack is a software module that processes packets of data which are received from or are transmitted to the LAN using the corresponding protocol. The protocol stacks and the associated lower-level software for network communications are typically stored and executed on a network interface device which may be embedded in or attached to the peripheral. The network interface device serves as an interface which allows the peripheral to communicate with other networked devices via the LAN.

Due to the large number of users and devices associated with a LAN, management of the LAN can be quite complex and is handled by a system administrator. The system administrator is the person that a user typically contacts when the user has a problem relating to the network. However, the increasing growth and complexity of LANs is making it more difficult for a user to contact a system administrator. For example, the identity and/or location of the system administrator may not be known to many users. In addition, a heterogeneous LAN may have multiple system administrators for dealing with problems relating to different respective protocols. A user may not know which of the system administrators should be contacted about a certain problem.

While contacting the system administrator is becoming more difficult, the need for a user to contact the system administrator is increasing. Since many users can share a peripheral, a LAN makes peripherals more cost effective. This has led to the development, and purchase by users, of peripherals having an increasing number and variety of complex features. A user may not have access to a user's manual and, therefore, may not be able to find out how to use a particular feature without assistance from the system administrator. Further, many peripherals display messages or instructions to aid a user in correcting error conditions in the peripheral so that normal operation can resume. However, a user may require help in understanding and complying with the messages or instructions. Accordingly, the user may need to contact the system administrator to request help, but may be unable to determine who to contact and where to contact them.

Further complicating the situation, peripherals that are shared by many users are often situated at a central location. As a result, a user must leave his or her office and go to the central location to retrieve documents that result from use of a peripheral, e.g., printouts or copies. If the user requires help regarding use of the peripheral when the user is at the central location, he or she will be inconvenienced and frustrated by having to return to his or her office to seek out information regarding who to contact for help.

Accordingly, a way is needed for a user to request help from a system administrator directly from the location of a peripheral and without knowledge of the system administrator's identity and/or location.

SUMMARY OF THE INVENTION

The aforementioned need is addressed by the present invention in which a message to a system administrator is input on a front panel of a peripheral device and is transmitted to the system administrator via a network interface device.

In one aspect, the present invention is a method of transmitting a message to a system administrator of a local area network (LAN) from a front panel of a peripheral device which is interfaced to the LAN via a network interface device having a storage device. A signal representing a message to the system administrator is input on the front panel of the peripheral device and is transmitted to the network interface device. The input signal is detected at the network interface device and, in response to the detection, destination information for messages to the system administrator is retrieved from the storage device. A notification packet is then formed which includes the retrieved destination information, identification information regarding the peripheral device, and the message represented by the input signal, and the notification packet is transmitted to the system administrator using the retrieved destination information.

By virtue of this arrangement, a user can transmit a message, such as a request for help, to the system administrator using the front panel of the peripheral without any knowledge of the identity or location of the system administrator.

In another aspect, the present invention is a method of notifying a system administrator of a LAN of a message input on a front panel of a peripheral device interfaced to the LAN via a network interface device having a storage device. Signals input on the front panel of the peripheral device are received at the network interface device and are analyzed to detect a message signal representing a message to the system administrator. In response to detection of the message signal, destination information for messages to the system administrator is retrieved from the storage device. A notification packet is then formed which includes the retrieved destination information, identification information regarding the peripheral device, and the message represented by the message signal. The notification packet is then transmitted to the system administrator using the retrieved destination information.

By virtue of this arrangement, a message can be transmitted to the system administrator by a network interface device based solely on a signal input by a user on the front panel of the peripheral, without any need for the user to input information specifying the destination of the message.

According to yet another aspect, the present invention is a network interface device which interfaces between a peripheral device having a front panel and a LAN. The network interface device includes a LAN interface for sending signals to and receiving signals from the LAN, a peripheral interface for sending signals to and receiving signals from the peripheral device, and a storage device that stores destination information for messages to the system administrator. The network interface device further includes a processor that (i) analyzes signals received from the front panel of the peripheral device via the peripheral interface to detect a message signal representing a message to the system administrator, (ii) retrieves the destination information from the storage device in response to detection of the message signal, (iii) forms a notification packet including the retrieved destination information, identification information regarding the peripheral device, and the message represented by the message signal, and (iv) transmits the notification packet to the system administrator using the retrieved destination information.

By virtue of this arrangement, the network interface device maintains the necessary information for contacting the system administrator so that only a message need be input on the front panel of the peripheral, without the need to input any information specifying the destination of the message.

This brief summary has been provided so that the nature of the invention may be understood quickly. A more complete understanding of the invention can be obtained by reference to the following detailed description of the preferred embodiment thereof in connection with the attached drawings.

DESCRIPTION OF THE PREFERRED EMBODIMENT

[1. System Overview]

Figure 1:
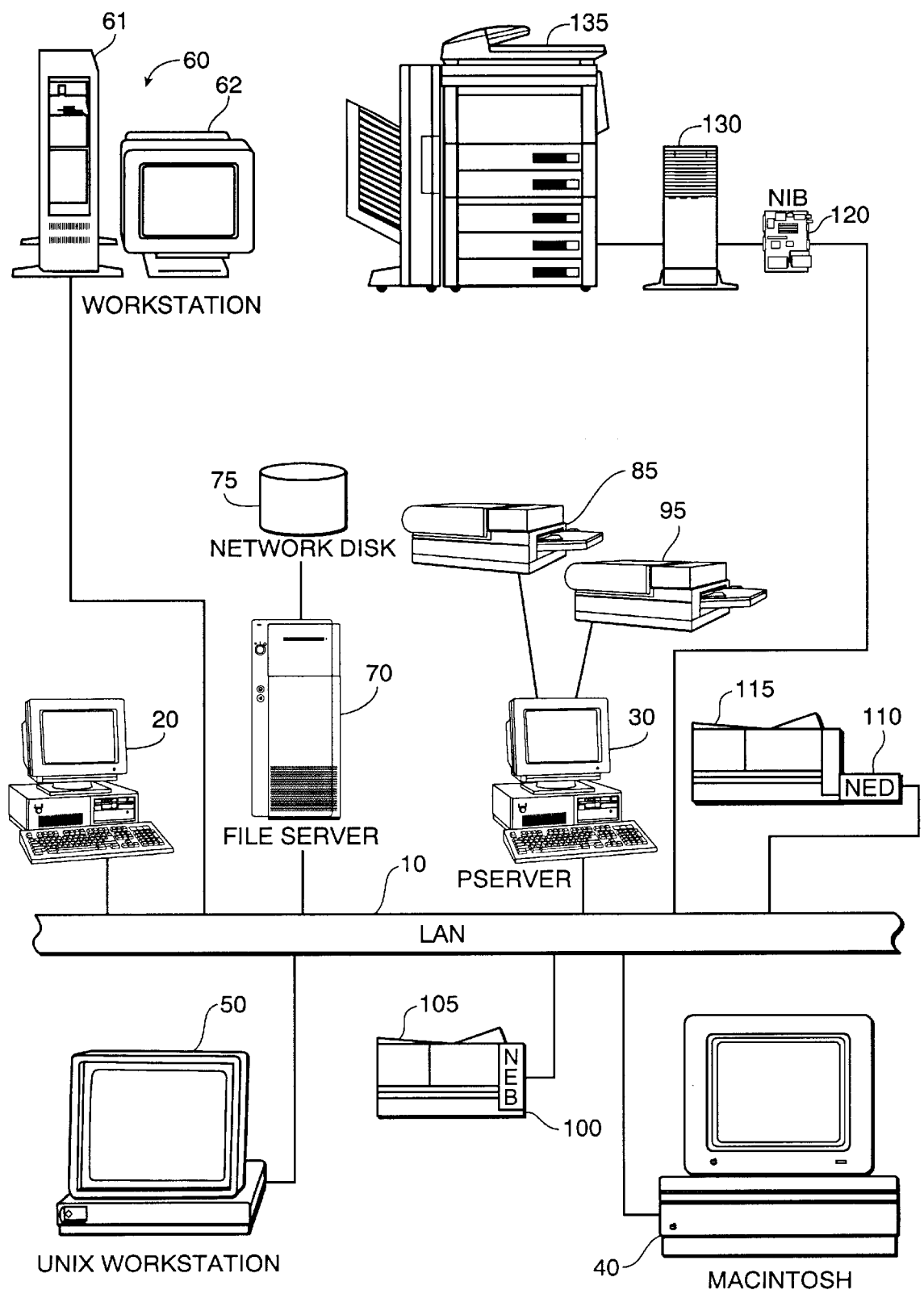
FIG. 1 is a diagram of a local area network.

FIG. 1 is an illustration of a heterogeneous network system including several different types of computers and several different peripherals to which the computers can share access. The present invention can also be used with devices connected to a homogenous network, i.e., a network in which every device uses the same protocol.

In FIG. 1, LAN 10 is depicted as an Ethernet medium which has a bus-type architecture, but a Token-ring medium having a ring-type architecture can be used as well. Connected to LAN 10 are a PC 20 which serves as a system administrator's computer, a PC 30 which serves as a print server for printers 85 and 95, a Macintosh computer 40, a UNIX workstation 50, and a generalized workstation 60 having a control unit 61 and a display 62. A fileserver 70 allows shared access to a network disk 75. A network expansion board (NEB) 100 allows shared access to a printer 105, and a network expansion device (NED) 110 allows shared access to a printer 115. In addition, a network interface board (NIB) 120 allows shared access to a copier 135 via a multiple device controller (MDC) 130.

Figure 2:
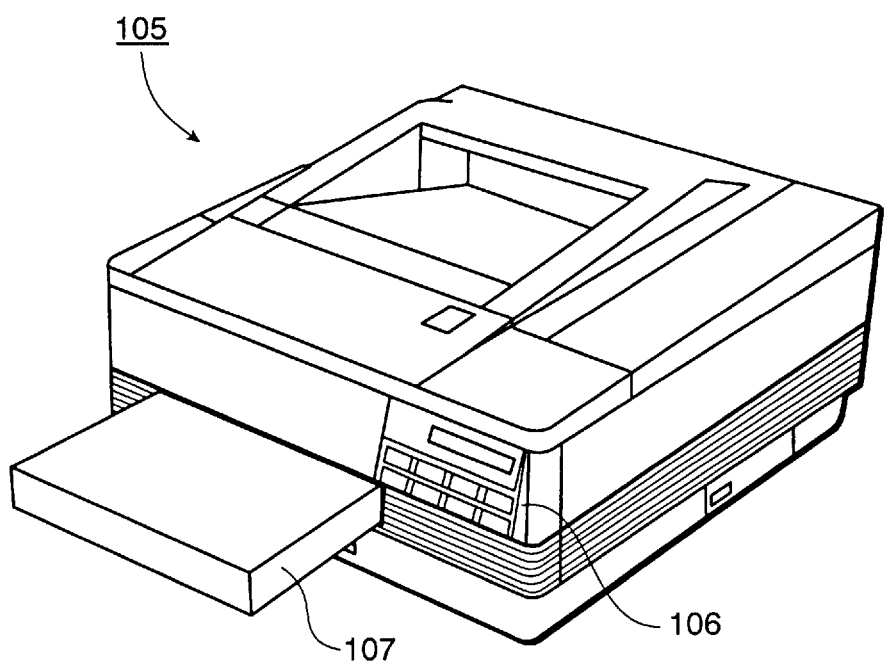
FIG. 2 is a view of a printer which is interfaced to the local area network.

FIG. 2 is a view of printer 105, which has a front panel 106 and a paper tray 107. Printers 85, 95, and 115 may be of the same type.

Figure 3:
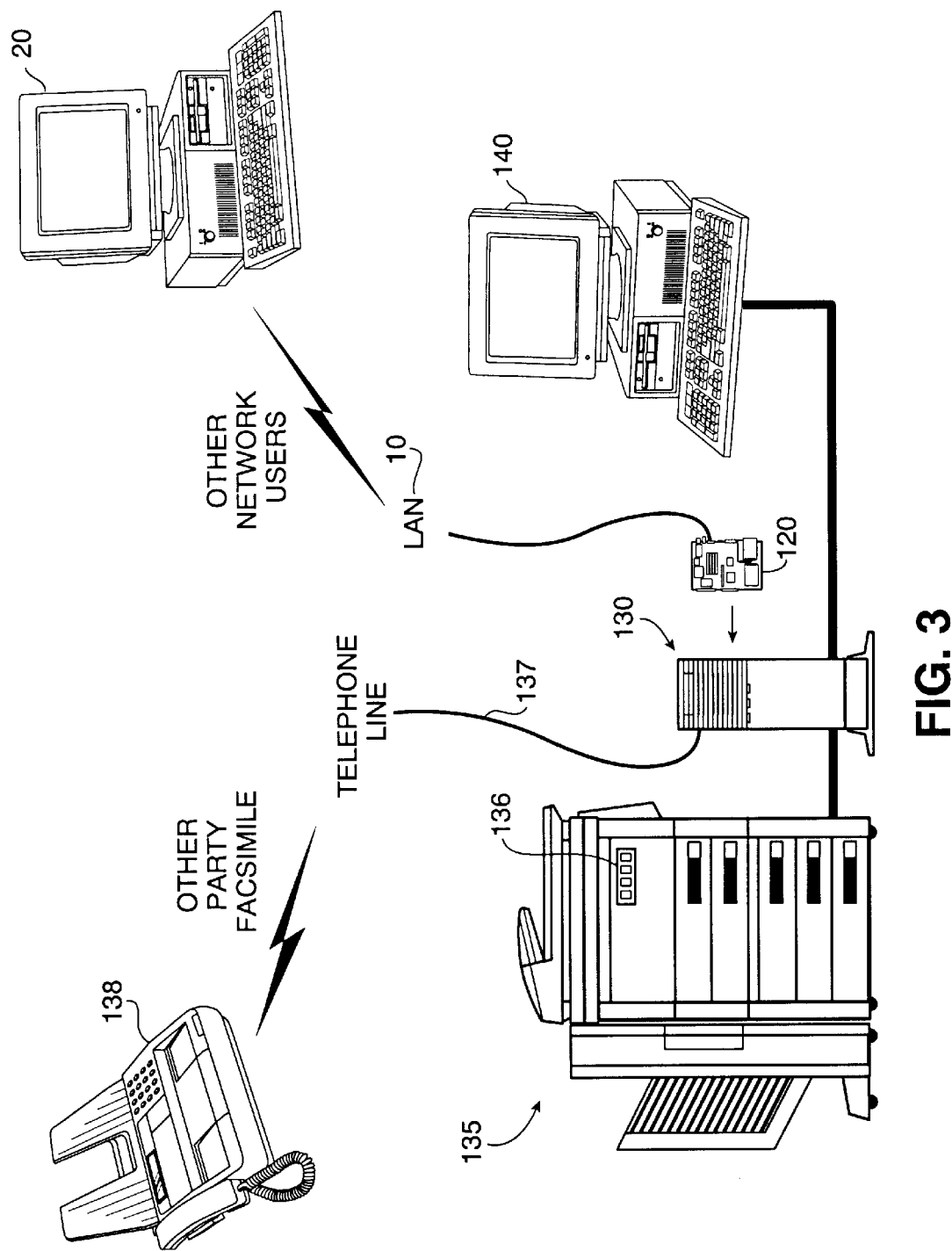
FIG. 3 is a view of a cut-away section of the local area network which includes a copier that may be shared by network devices.

FIG. 3 is a cut-away section of LAN 10 showing NIB 120, MDC 130, and copier 135 in greater detail. Copier 135 may be, for example, a GP55 copier from Canon, Inc., and copier 135 has a front panel 136 for inputting signals to control the copier. A local PC 140 can also be used to control copier 135. FIG. 3 also illustrates a telephone line 137 connecting MDC 130 to a facsimile device 138. MDC 130 includes a facsimile board (not shown) together with NIB 120, which allows data to be exchanged between copier 135 and facsimile device 138.

A preferred form of the present invention is described below in the context of NEB 100. However, the present invention is applicable to embedded network devices in general and can also be applied to network interface devices such as NED 110 (an example of which is described in copending U.S. patent application Ser. No. 08/489,116, filed on Jun. 9, 1995, and entitled "Outputting a Network Device Log File") and NIB 120 (an example of which is described in U.S. Pat. application Ser. No. 08/409,034, filed on Mar. 23, 1995, and entitled "Network Interface Board For Digital Copier", which is assigned to the assignee of the present invention).

[2. NEB Architecture]

Figure 4:
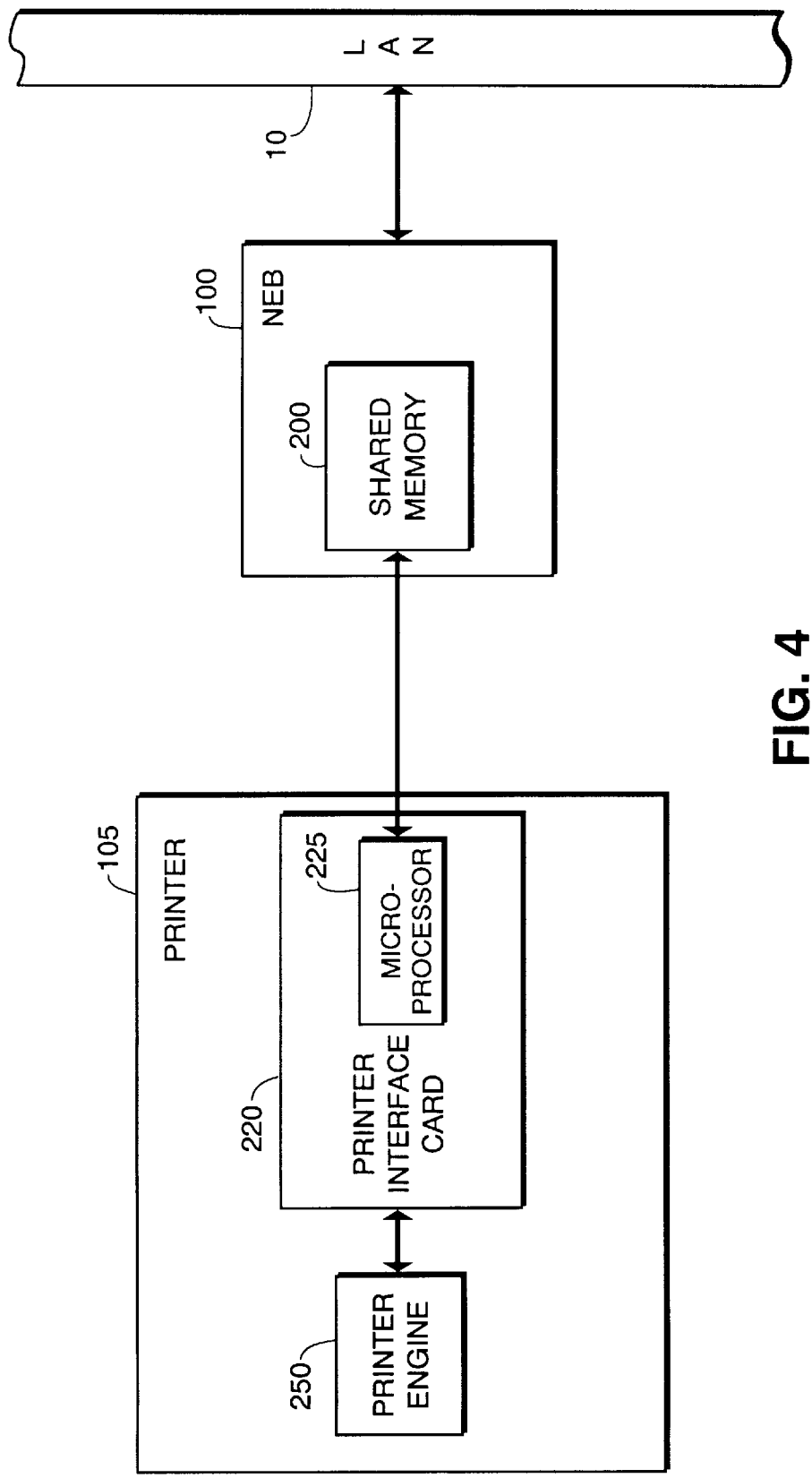
FIG. 4 is a block diagram showing the connection between a local area network, a printer, and a network expansion board for interfacing between the printer and the local area network.

FIG. 4 is a block diagram showing NEB 100 coupled between LAN 10 and printer 105. As shown in FIG. 4, NEB 100 includes a shared memory 200 which is used for bidirectional communications between NEB 100 and printer 105. Printer 105 includes a printer interface card 220 having a microprocessor 225 that reads data from and writes data to shared memory 200. Printer 105 also includes a printer engine 250 connected to printer interface card 220.

Figure 5:
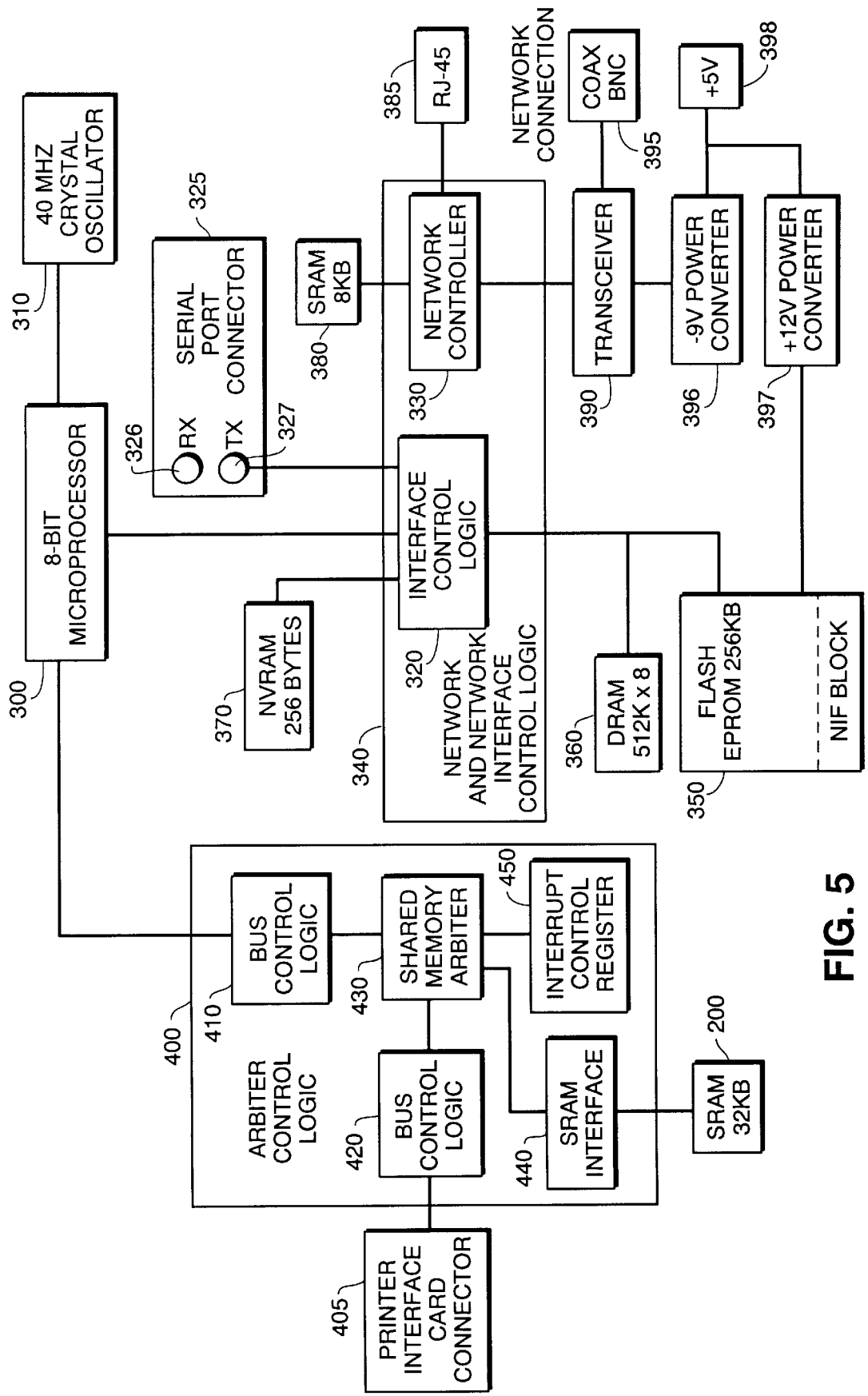
FIG. 5 is a functional block diagram of the network expansion board depicted in FIG. 4.

FIG. 5 is a functional block diagram of NEB 100. Broadly speaking, NEB 100 is an interactive network circuit board which couples printer 105 to LAN 10, making printer 105 a responsive and interactive network member. NEB 100 receives print data, status requests, and control commands from LAN 10, transmits print data, status requests, and control commands to printer 105 for execution, and transmits status information back to LAN 10. Thus, NEB 100 can perform not only RPRINTER remote printer services and PSERVER print server functionalities, but can also offer to network members whatever status and control features are available from the peripheral interface.

Power for all circuits is supplied to NEB 100 from a +5V power source 398. Power is provided from power source 398 to power converter 396 which provides −9V power to a transceiver 390 and to power converter 397 which provides +12V power to a flash EPROM 350 for "flashing" (i.e., reprogramming of the EPROM). Network and network interface control logic 340 is preferably a single 144-pin application specific integrated circuit (ASIC) that includes a network controller 330 and interface control logic 320. Network controller 330 is an NCR macro-cell compatible with a National DP83902A "ST-NIC" Ethernet controller, the details of which can be found in National Semiconductor's *Local Area Networks Databook*, National Semiconductor p/n 400055, National Semiconductor, 1993. Network controller 330 is designed to interface with CSMA/CA-type (carrier sense multiple access with collision detection) local area networks.

Network controller 330 connects with RJ-45 connector 385 directly and with coaxial connector 395 through transceiver 390, which is preferably a National Semiconductor DP8392 coaxial transceiver interface, the details of which can also be found in National's *Local Area Networks Databook*. Network controller 330 is also coupled to an 8 KB SRAM 380 that is used as an input/output packet buffer for Ethernet data. This memory should preferably have an access time of about 70 ns or less.

Interface control logic 320 provides an interface between network controller 330, microprocessor 300, and memory devices EPROM 350 and DRAM 360. Interface control logic 320 also interfaces with non-volatile random access memory (NVRAM) 370, which is a 256 byte serial electrically erasable/programmable memory used for initialization data storage during power cycling of printer 105. Network and printer configuration parameters are written into NVRAM 370 when printer 105 is first installed onto the network to allow NEB software to recover the installation parameters after printer power has been cycled off and on.

Interface control logic 320 also couples with serial port connector 325, which comprises a receive data pin 326 and a transmit data pin 327 that can respectively receive and transmit serial data streams for debugging purposes. Interface control logic 320 senses data present at the receive data line and samples the serial bits at regular intervals.

The central controller of NEB 100 is microprocessor 300, which is preferably an Intel 80C188EA-20 8-bit processor, the details of which can be found in the 80C186EA/80188EA User's Manual, Intel p/n 270950-001, Intel Corp. This processor is an 8-bit processor with direct memory access (DMA), interrupts, timers, and a DRAM refresh control. Other microprocessors, such as an AMD 80C188-20 8-bit microprocessor, might alternatively be used. 256 KB flash EPROM 350 and 512 KB DRAM 360 are coupled to microprocessor 300 via interface control logic 320, while 32 KB SRAM 200 (which is shared with printer interface card 220) is coupled with microprocessor 300 via arbiter control logic 400. A 40 MHz, 50 ppm crystal oscillator 310 provides microprocessor 300 with a clock signal that is wholly separate from and asynchronous with the clock signal provided to microprocessor 225 on printer interface card 220.

Microprocessor 300 executes instructions in flash EPROM 350, which stores control firmware and printing application software. After power-on self-test (POST), code from EPROM 350 is selectively moved to the higher performance 512 KB DRAM 360, which should preferably have an access time of about 80 ns, for actual execution.

All communication between NEB 100 and printer interface card 220 is executed via 32 KB shared SRAM 200. Arbiter control logic 400, preferably a single 100-pin ASIC, arbitrates between the two-byte-wide memory accesses of printer interface microprocessor 225 and the single-byte-wide memory accesses of NEB microprocessor 300, each of which is completely independent of the other.

Generally speaking, the 8-bit data bus of microprocessor 300 on board NEB 100 communicates with bus control logic 410, while the 32-bit data bus of microprocessor 225 on board printer interface card 220 communicates with bus control logic 420. Memory accesses from each bus are routed to shared memory arbiter 430, which determines which bus has priority and permits the bus with priority to access SRAM 200 via SRAM interface 440. Interrupt control register 450 is also accessed through shared memory arbiter 430, to allow one microprocessor to interrupt the other.

All software modules executed by microprocessor 300 are stored in flash EPROM 350. Those modules that are needed are selectively loaded from EPROM 350 into DRAM 360 and are executed from DRAM. This permits flexible configuration of NEB 100 by selection of which modules are to be loaded.

Figure 6:
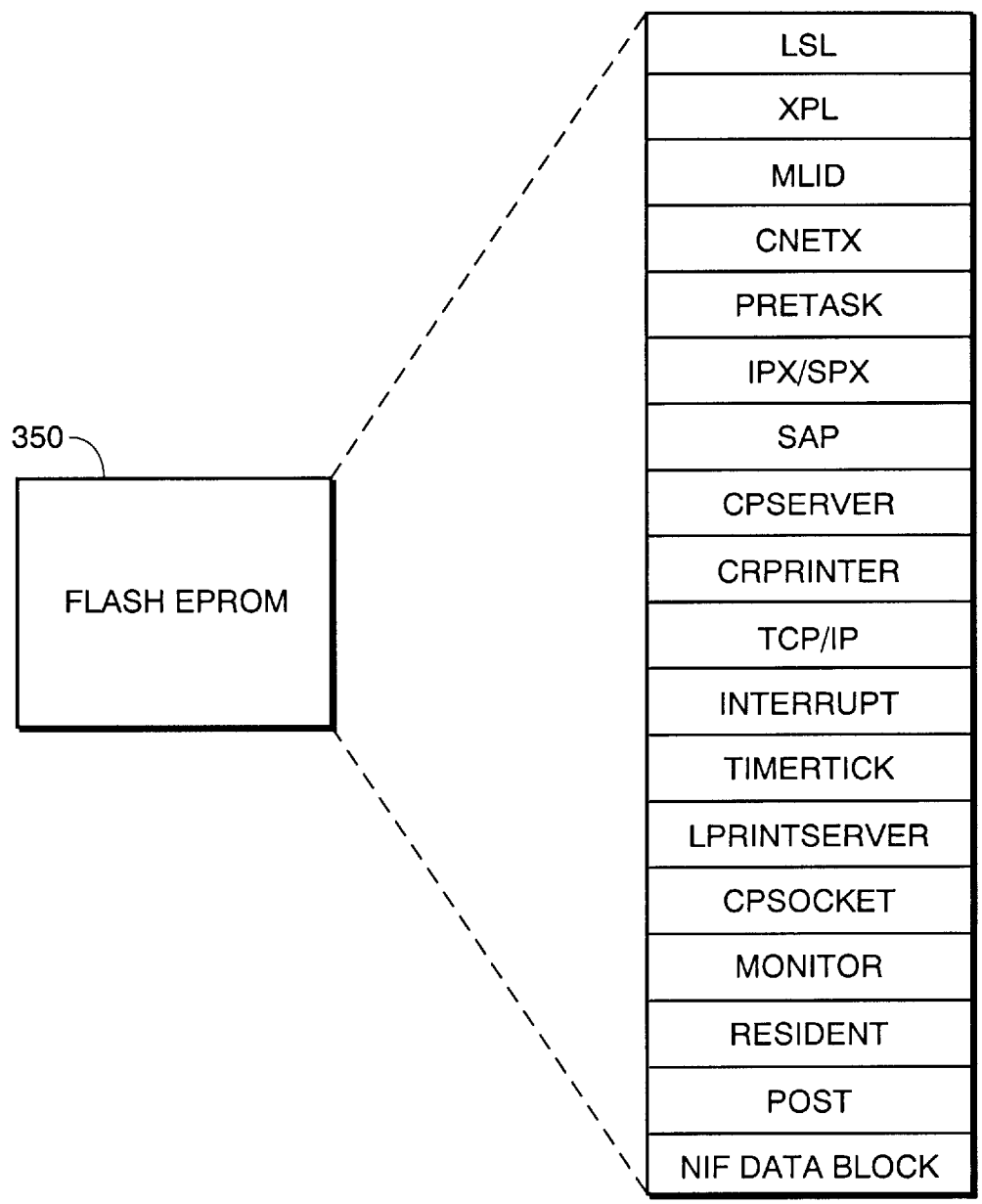
FIG. 6 illustrates software modules that may be bred in memory on the network expansion board.

FIG. 6 illustrates an example of blocks of code, or software modules, that are stored in flash EPROM 350. The XPL module provides a standardized interface between printer 105 and NEB 100. MLID (Multi Link Interface Driver) is a piece of Novell code (Media Support Module, or MSM) linked together with a piece of customized code (Hardware Support Module, or HSM) that is the lowest level of network connection, while LSL (Link Support Layer) is a piece of Novell code that acts as a multiplexer between the low level MLID and the several protocol stacks above it. CNETX is customized code that turns local DOS-like function calls into network function calls, providing file functions like OPEN, READ, WRITE, and CLOSE.

The PRETASK module is responsible for identifying what frame types are associated with the various possible protocol stacks. Because NEB 100 supports multiple protocol stacks, this module exists as long as NEB 100 is running.

Novell's IPX/SPX protocol stack is contained in flash EPROM 350, and is supported by SAP, or Service Advertising Protocol. SAP is a Novell concept that allows devices to register themselves into the file server's bindery, which lists active and inactive network entities. SAP registers NEB 100 via CPSOCKET, and if NEB 100 is configured as a print server, SAP also registers the print server with the NetWare bindery.

CPSERVER is a custom implementation of a Novell print server application. This module provides self-generated print banners, user notification of completion and exception status, and transmission of print data and status commands to the printer. This differs from the Novell print server in that CPSERVER is dedicated to driving the local printer (i.e., printer 105 in which NEB 100 is installed) and cannot drive any remote RPRINTERs. This program owns the print data lines for the duration of a print job. CRPRINTER is a custom implementation of a Novell RPRINTER print application. This module is an application that is sent data by a Novell print server application elsewhere on LAN 10.

The TCP/IP protocol stack has User Datagram Protocol (UDP), Reverse Address Resolution Protocol (RARP) and BootP support within. INTERRUPT is the interrupt handler for the TCP/IP task, while TIMERTICK is the timer tick for UNIX TCP/IP network tasks. LPRINTSERVER is the TCP/IP print server application, and also owns the print data lines for the duration of a print job.

The CPSOCKET program runs for all protocol stacks. The program responds to requests for connection, requests for data download, or requests for services from remote utilities, and provides status and control to other tasks via interprocess communication. Because CPSOCKET typically owns the status and control lines between NEB 100 and printer 105, it is the only task that has the ability to obtain printer status via the status lines. CPSOCKET is responsible for the network connection and packet contents between the Novell-oriented status and control utilities (CPNET or the corresponding Windows version of client-based software utilities), or between the UNIX-oriented status and control utilities (CPUTIL).

In the preferred embodiment, CPSOCKET also includes code to implement a HelpRequest routine which performs processing of a help request signal input on front panel 106 of printer 105. Operation of the HelpRequest routine will be described in more detail below. Alternatively, the HelpRequest routine can be implemented as a separate software module or as part of a module other than CPSOCKET.

MONITOR is a customized multi-tasking monitor which performs task creation, task destruction and microprocessor dispatch. MONITOR also has memory management sub-modules MEMGET and MEMFREE. RESIDENT is a block of routines that provides generic services such as read and write to flash EPROM 350, FLASH code, ROM based debugger, hardware timer tick and other basic features. POST is a power-on self-test module that checks the integrity of NEB hardware and software at power-up.

Also stored in EPROM 350 is a network identification file (NIF) data block which stores board-invariant information, which is unique for every network board, hardware configuration data, board revision number and the like, as well as changeable information such as software version number. The information in the NIF data block is used to ensure that flash EPROM 350 is not reprogrammed with an incompatible firmware image.

Specifically, EPROM 350 stores "board" information such as model number, firmware level, and board revision number, as well as "network" information such as Media Access Control (MAC) address, which is unique for every network board, board name, network frame type, primary file server identification, queues serviced, network protocol, sampling frequency, PSERVER name, zone-name, and the like.

[3. Transmitting A Message To System Administrator]

Figure 7:
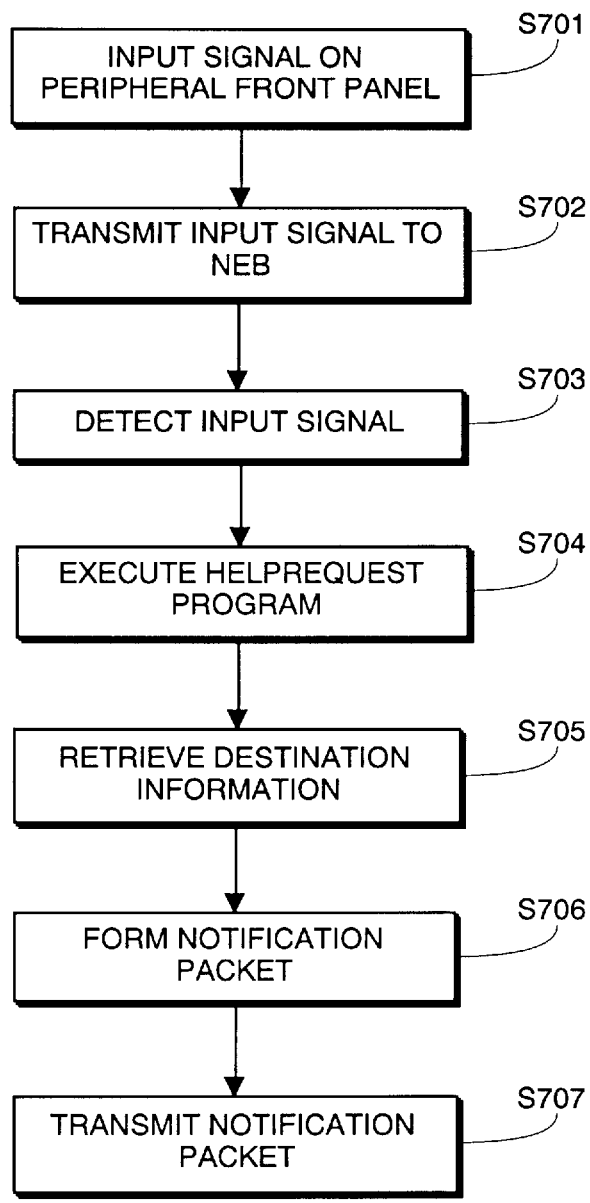
FIG. 7 is a flow diagram showing process steps for transmitting a message to a system administrator via a front panel of a peripheral.

FIG. 7 is a flow diagram illustrating process steps for transmitting a message to a system administrator of a LAN from a front panel of a peripheral device which is interfaced to the LAN via a network interface device having a storage device. Briefly, according to FIG. 7, a signal representing a message to the system administrator is input on the front panel of the peripheral. The input signal is then transmitted to the network interface device. The input signal is detected at the network interface device and, in response to detection of the input signal, destination information for messages to the system administrator is retrieved from the storage device. A notification packet is formed including the retrieved destination information, identification information regarding the peripheral device, and the message represented by the input signal. The notification packet is then transmitted to the system administrator using the retrieved destination information.

In more detail, in step S701 a message to the system administrator is input by inputting a signal via front panel 106 of printer 105. In the preferred embodiment, the message is a request for help and is represented by a predetermined number of status changes in printer 105 within a predetermined time period. In particular, the input signal in the preferred embodiment is input by operating an online/offline button on front panel 106. For example, the input signal may correspond to operation of the online/offline button on front panel 106 three times within 12 seconds. If status changes of printer 105 are also used to trigger other functions, such as generation of a testpage by NEB 100, a different number of status changes can be used to correspond to each different function.

The input signal used in the preferred embodiment has the advantage that transmission of the input signal to NEB 100 requires only the ability to transmit minimal status information between the printer and the network interface device. This type of input signal is ideally suited for application of the present invention to network interface devices which are not capable of bidirectional communication with the peripheral coupled to the device. For example, if NED 110 is connected to printer 115 through a parallel port, then NED 110 can receive only paper out, busy, I/O error, and online/offline status signals from printer 115. However, those signals are sufficient to enable use of the present invention when the input signal of the preferred embodiment is used.

If a bidirectional communication channel exists between a peripheral and a network interface device, as is the case with NEB 100 or NIB 120, then the input signal that can be used in step S701 is limited only by the types of input signals that can be accepted by the peripheral and transmitted to the network interface device. For example, some peripheral devices have the ability to display menu options and allow a user to select a desired menu option. Moreover, some peripheral devices that have menu-driven functions allow an interface device to add a menu option to the display. The above-mentioned GP55 copier is such a device. Thus, when NIB 120 is used with a GP55 copier, the message to the system administrator can be input by selecting a menu option, as discussed in greater detail below. Further, if a peripheral device allows entry of text characters via the front panel, a text message can be input and transmitted to the system administrator.

In step S702, the input signal is transmitted to NEB 100. In the preferred embodiment, status information for printer 105 is written to SRAM 200 whenever a status change occurs. Alternatively, status information can be transmitted in response to periodic inquiries from NEB 100.

In step S703, the input signal is detected at NEB 100. If the input signal corresponds to a predetermined number of status changes, as in the preferred embodiment, then the input signal is detected by sensing the status changes using, for example, a process discussed in detail below with respect to FIG. 8. On the other hand, if the input signal is input by selecting a menu option, then the input signal is detected by sensing selection of the menu option using, for example, a process discussed in detail below with respect to FIG. 9.

After detection of the input signal in step S703, flow advances to step S704 in which the HelpRequest routine is executed. Flow then advances to step S705 in which the HelpRequest routine retrieves destination information for messages to the system administrator from NVRAM 370. The destination information can alternatively be stored in EPROM 350. This alternative would be particularly appropriate when the present invention is applied to NED 110, which does not include an NVRAM.

In the preferred embodiment, the destination information stored in NVRAM 370 is a unique name that identifies the system administrator. The name is then used to retrieve a MAC address for a computer registered to that name in fileserver 70. An advantage of this approach is that no specific information about the system administrator's location is needed in NEB 100. The system administrator can be located as long as fileserver 70 is updated to reflect the network address of the computer currently used by the system administrator. Alternatively, NVRAM 370 can store the MAC address directly. The destination information stored in NVRAM 370 can be stored using a utility program such as the above-mentioned CPNET or a Windows-based functional equivalent executing on a computer, e.g., the system administrator's computer 20. Different network devices can be configured to store different destination information, so that one group of peripherals can be configured to send messages to a first system administrator and another group of peripherals can be configured to send messages to a second system administrator. Further, destination information for multiple system administrators can be stored in NVRAM 370 together with data specifying a protocol or protocols to use for sending a message to one or more of the system administrators.

In addition, the destination information need not be a MAC address for sending a message via LAN 10. Instead, the destination information also can represent, for example, a telephone number for a facsimile device or a pager. This alternative requires that the peripheral have a modem or other structure for communicating over a telephone line, such as MDC 20 for copier 135.

Figure 10:
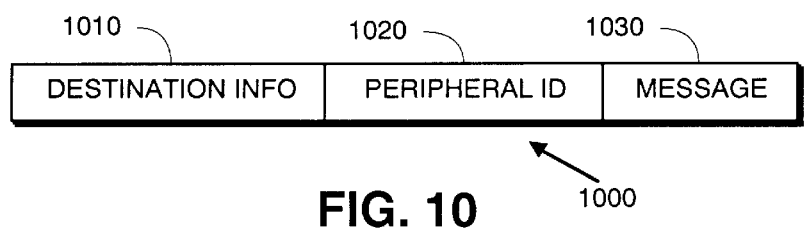
FIG. 10 shows an exemplary format of a notification packet formed by a network interface device to transmit a message to the system administrator.

After retrieving the stored destination information, flow advances to step S706 in which the HelpRequest routine forms a notification packet to carry a message to the system administrator. FIG. 10 shows an exemplary format for a notification packet 1000, which includes destination information 1010, peripheral ID information 1020, and a message 1030. In the preferred form, destination information 1010 is a MAC address for the system administrator's computer 20 which is obtained either directly or by reference to fileserver 70 based on the destination information retrieved in step S705 for messages to the system administrator. Peripheral ID information 1020 is data that allows the system administrator to identify which peripheral device transmitted a message received by the system administrator. In the preferred form, peripheral ID information 1020 is simply the MAC address of printer 105, which is retrieved from the NIF block in EPROM 350.

Message 1030 is the message to be sent to the system administrator and is preferably a string of text characters. As mentioned above, the input signal input at front panel 106 in the preferred form represents to a request for help. More specifically, the input signal corresponds to a prestored help request message which is stored, for example, in NVRAM 370. The help request message is a text string such as "HELP REQUESTED" and can be stored when NEB 100 is manufactured or initialized, or by using the client utility that is used to set destination information in NVRAM 370. When the HelpRequest routine forms notification packet 1000, the prestored message is retrieved from NVRAM 370 and used as message 1030.

Alternatively, if the peripheral device allows a text character string to be input as part of the input signal, the input text character string is used as message 1030 in notification packet 1000. In this way, a user can enter text on the front panel of a peripheral to provide a more detailed message to the system administrator. For example, the text can indicate a particular problem which the user is encountering, a telephone number at which the system administrator can reach the user, and/or the name of the user transmitting the message.

After notification packet 1000 is formed in step S706, flow advances to step S707 in which the notification packet is transmitted to the system administrator using destination information 1010 retrieved from NVRAM 370. In the preferred form, since destination information 1010 is a MAC address for the system administrator's computer 20, the notification packet is sent via LAN 10 using the normal network communication facilities of NEB 100. If the destination information retrieved from NVRAM 370 represents a facsimile number or pager number, data must be stored with the destination information so that the HelpRequest routine recognizes what type of data the destination information represents. The HelpRequest routine can than route the notification packet to the appropriate facility, e.g., a facsimile board or modem, for transmission to the system administrator.

In the preferred form, process steps S704 through S707 of FIG. 7 are implemented by the HelpRequest routine which, in the preferred embodiment, is a portion of CPSOCKET. Alternatively, those process steps can be stored as a separate software module in EPROM 350 or, since the XPL module provides the software interface between printer 105 and NEB 100, those process steps can be implemented within the XPL module.

Summarizing the steps of FIG. 7, a signal representing a message to the system administrator is input on the front panel of a peripheral device and is transmitted to a network interface device. The input signal is detected at the network interface device and, in response to the detection, destination information for messages to the system administrator is retrieved from the storage device. A notification packet is then formed which includes the retrieved destination information, identification information regarding the peripheral device, and the message represented by the input signal, and the notification packet is transmitted to the system administrator using the retrieved destination information.

Figure 8:
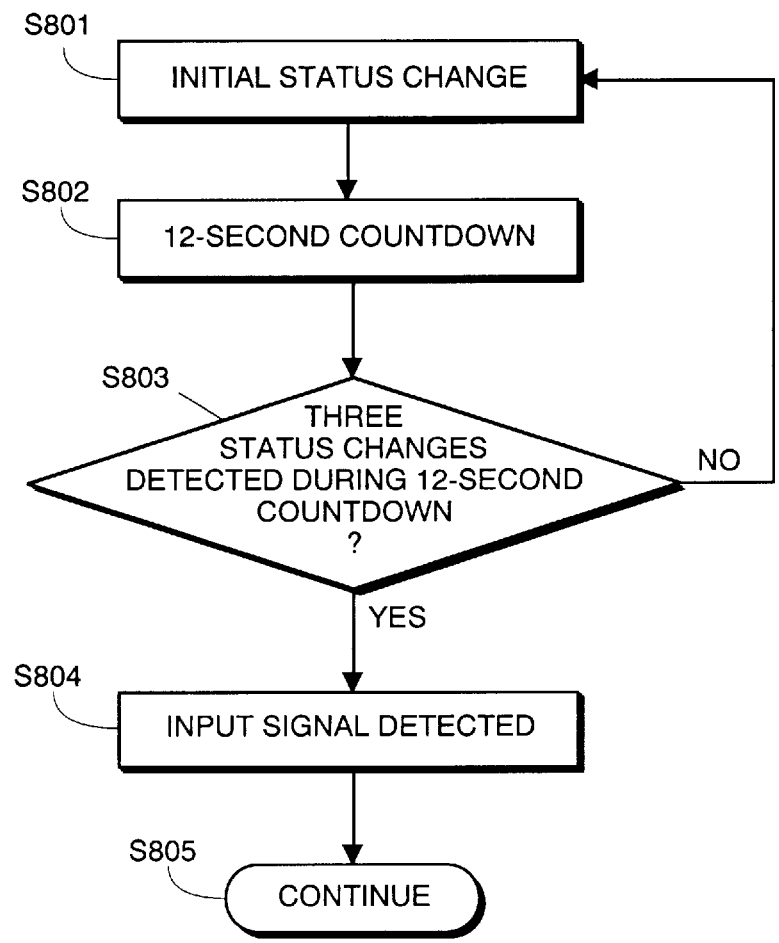
FIG. 8 is a flow diagram showing process steps for detecting a predetermined number of status changes of a peripheral within a predetermined time period.

FIG. 8, as mentioned above, is a flow diagram illustrating the detection of an input signal from front panel 106 of printer 105 based on status changes of printer 105. Beginning at step S801, microprocessor 300 monitors SRAM 200 for status changes in printer 105. An initial status change will be detected, for example, in the case where printer 105 is initially online and then is set offline. Similarly, an initial status change will be detected in the case where a paper error occurs. Microprocessor 300 may be programmed to recognize only one type of status change, e.g., a change in the online status, or to recognize any type of status change.

Once microprocessor 300 detects an initial status change in step S801, microprocessor 300 begins a countdown in step S802. If, before that countdown ends, microprocessor 300 detects a predetermined number of status changes in printer 105, microprocessor 300 interprets the predetermined number of status changes as an input signal representing a message to the system administrator. In a preferred embodiment of the present invention, the predetermined number of status changes is set to 3 and the countdown is set for 12 seconds. These settings are believed to be sufficiently unique to prevent inadvertent signalling of a system administrator, without making the process difficult to operate. However, these settings can be set as desired in microprocessor 300.

If it is determined in step S803 that microprocessor 300 did not detect three status changes before the 12 second countdown ended, then flow returns to step S801, whereafter any status change is interpreted as an initial status change which restarts the countdown.

If, however, it is determined in step S803 that the predetermined number of status changes occurs within the predetermined time period, flow proceeds to step S804 which makes a determination that the input signal has been detected. Flow then proceeds to step S805 and microprocessor 300 continues with other processing.

As discussed above, when the present invention is used with NIB 120 connected to a GP55 copier, NIB 120 can add a menu selection for transmitting a message, e.g., a help request, to front panel 136 of copier 135. The GP55 copier has associated therewith a core board (not shown) located in MDC 20. The core board initializes front panel 136 and provides an I/F (Interface) button menu option. NIB 120 communicates with copier 135 through a dual port RAM (DPRAM) interface (not shown) in lieu of SRAM 200. A software module XPDRIVER provides a software interface between NIB 120 and copier 135 to read and write data in the DPRAM. The DPRAM has a command area in which a command code and a unit code are written when copier 135 transmits signals and a response area in which microprocessor 300 writes data to be sent to copier 135.

Figure 9:
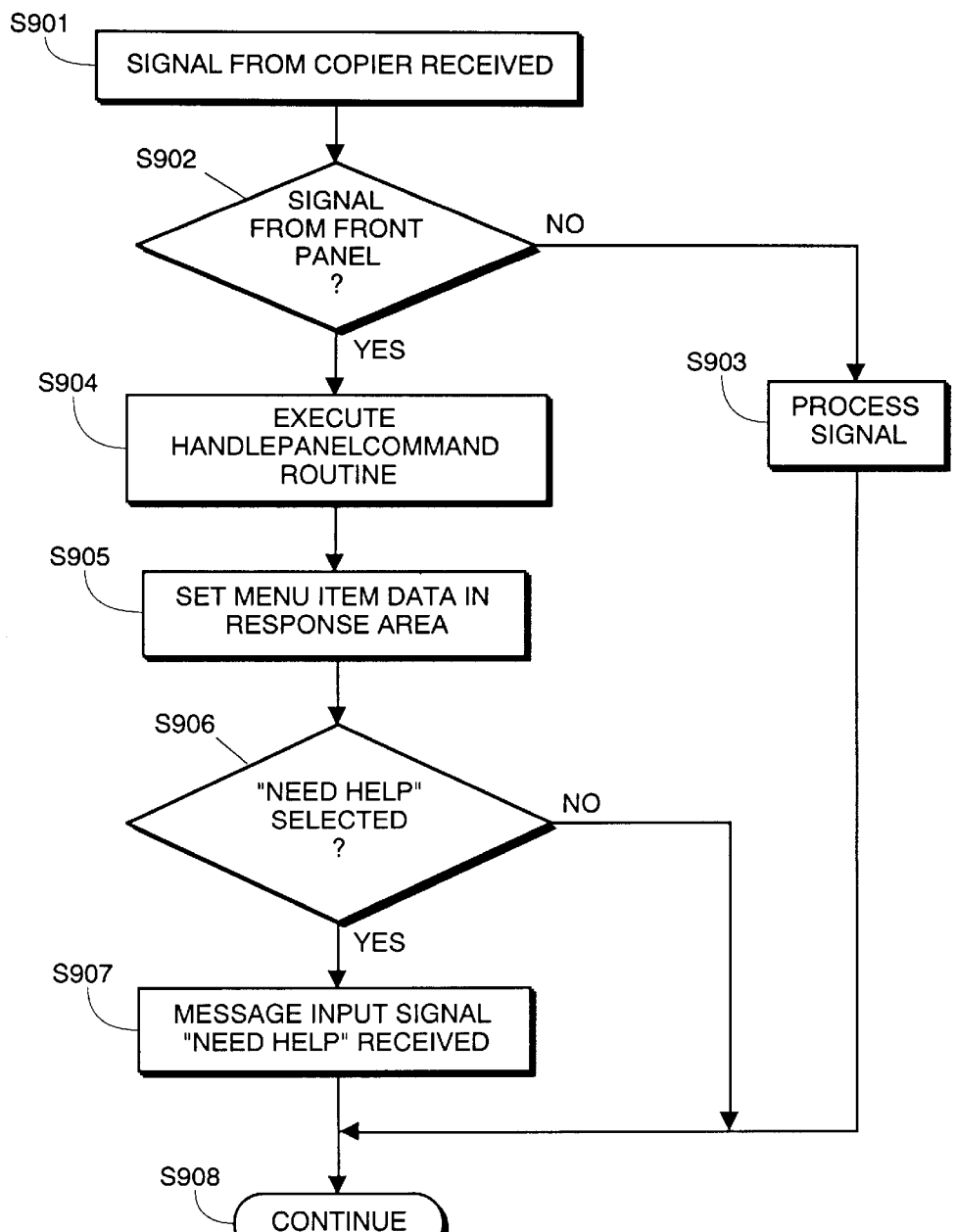
FIG. 9 is a flow diagram showing process steps for detecting selection of a menu option via a front panel of a peripheral.

FIG. 9, as mentioned above, is a flow diagram showing process steps for adding a menu option to front panel 136 of copier 135 and detecting an input signal representing a message to the system administrator based on selection of the menu option. In step S901, a signal from copier 135 is received by NIB 120. Receipt of the signal is indicated by an interrupt generated by DPRAM. In step S902, it is determined whether the signal is a front panel signal. This determination is performed by examining the command code and the unit code written in the command area of DPRAM. If the interrupt routine was entered because a user selected the I/F button on front panel 136, the command code and unit code will have values that microprocessor 300 can recognize as corresponding to an input signal from front panel 136. If the signal is not a front panel signal, flow proceeds to step S903 to perform the appropriate processing for the received command code and unit code. Flow then proceeds to step S908 in which microprocessor continues with other processing.

On the other hand, if it is determined in step S902 that the received signal is a front panel signal, flow advances to step S904 in which a routine HandlePanelCommand is executed. Flow then advances to step S905 in which HandlePanelCommand writes information to the response area of DPRAM to set a new menu item, such as "Need Help?", or to take other appropriate action. In response to this data, if necessary, the GP55 copier displays the menu item. Flow then advances to step S906, in which it is determined whether the "Need Help" menu button is selected by the user. If the user selects that button, the interrupt routine would be entered again. The interrupt routine would again detect that a front panel signal was received and HandlePanelCommand would be called again. If the "Need Help" button is not selected, flow proceeds to step S908 in which microprocessor 300 continues with other processing.

If it is determined in step S906 that the "Need Help?" button was selected, flow advances to step S907 in which it is determined that an input signal representing a message to the system administrator was received and the HelpRequest routine can be called. Flow then advances to step S908 and microprocessor 300 continues with other processing.

The above-described arrangement makes it possible for a user at a peripheral to transmit a message to the system administrator, such as a request for help, simply by inputting a signal on the front panel of the peripheral, without knowing the identity or location of the system administrator.

While the preferred embodiment of the invention has been described, it is to be understood that the invention is not limited to the above-described embodiments and that various changes and modifications may be made by those of ordinary skill in the art without departing from the spirit and scope of the invention.

What is claimed is:

1. A method of transmitting a message to a system administrator of a local area network (LAN) using a status button on a front panel of a peripheral device which is interfaced to the LAN via a network interface device having a storage device, said method comprising the steps of:

storing a message to the system administrator in the storage device;

inputting a signal corresponding to the message stored in the storage device on the front panel of the peripheral device, the signal comprising a predetermined number of status changes effected over a predetermined period of time using the status button;

transmitting the input signal to the network interface device;

detecting the input signal at the network interface device;

retrieving destination information for the message to the system administrator in response to detection of the input signal;

retrieving the message from the storage device in response to detection of the input signal;

forming a notification packet including retrieved destination information, identification information regarding the peripheral device, and the message retrieved from the storage device; and transmitting the notification packet to the system administrator using the retrieved destination information.

2. A method according to claim 1, wherein the destination information includes data corresponding to the network media access control (MAC) address for a computer used by the system administrator, and wherein said transmitting step comprises transmitting the notification packet to the system administrator's computer via the LAN.

3. A method according to claim 1, wherein the input signal corresponds to a help request message, and wherein said forming step includes retrieving the help request message from the storage device.

4. A method according to claim 1, wherein the status button comprises an online/offline button which is used to place the peripheral device either online or offline.

5. A method of notifying a system administrator of a local area network (LAN) of a message using a status button on a front panel of a peripheral device interfaced to the LAN via a network interface device having a storage device, said method comprising the steps of:

storing a message to the system administrator in the storage device;

receiving signals input on the front panel of the peripheral device at the network interface device, the signals comprising a predetermined number of status changes effected over a predetermined period of time using the status button;

analyzing the received signals to detect a message signal corresponding to the message to the system administrator;

retrieving destination information for messages to the system administrator in response to detection of the message signal;

retrieving from the storage device the message that corresponds to the input signal;

forming a notification packet including the retrieved destination information, identification information regarding the peripheral device, and the message corresponding to the message signal; and transmitting the notification packet to the system administrator using the retrieved destination information.

6. A method according to claim 5, wherein the destination information includes data corresponding to a network media access control (MAC) address for a computer used by the system administrator, and wherein said transmitting step comprises transmitting the notification packet to the system administrator's computer via the LAN.

7. A method according to claim 5, wherein the message signal corresponds to a help request message, wherein said analyzing step detects the message signal by recognizing the predetermined number of status changes within the predetermined time period, and wherein said forming step includes retrieving the help request message from the storage device.

8. A method according to claim 5, wherein the status button comprises an online/offline button which is used to place the peripheral device either online or offline.

9. A network interface device which interfaces between a peripheral device having a front panel and a local area network (LAN), the front panel of the peripheral device including a status button for effecting status changes of the peripheral device, said network interface device comprising:

a LAN interface for sending signals to and receiving signals from the LAN;

a peripheral interface for sending signals to and receiving signals from the peripheral device;

a storage device that stores a message to a system administrator; and a processor that (i) analyzes signals received from the front panel of the peripheral device via the peripheral interface to detect a message signal corresponding to the message to the system administrator, the signals comprising a predetermined number of status changes effected over a predetermined period of time using the status button, (ii) retrieves the message to the system administrator from the storage device in response to detection of the message signal, (iii) retrieves destination information in response to the detection of the message signal, (iv) forms a notification packet including the retrieved destination information, identification information regarding the peripheral device, and the message corresponding to the message signal, and (v) transmits the notification packet to the system administrator over the LAN interface using the retrieved destination information.

10. A network interface device according to claim 9, wherein the destination information includes data corresponding to a network media access control (MAC) address for a computer used by the system administrator, and wherein said processor transmits the notification packet to the system administrator's computer via the LAN.

11. A network interface device according to claim 9, wherein the message signal corresponds to a help request message and, wherein said processor detects the message signal by recognizing the predetermined number of status changes within the predetermined time period, retrieves the help request message from the storage device in response to detection of the message signal, and includes the help request message in the notification packet.

12. A network interface device according to claim 9, wherein the status button comprises an online/offline button which is used to place the peripheral device either online or offline.

13. Computer-executable process steps stored on a computer-readable medium, the process steps to transmit a message to a system administrator of a local area network (LAN) using a status button on a front panel of a peripheral device which is interfaced to the LAN via a network interface device having a storage device, said computer-executable process steps comprising:

code to store a message to the system administrator in the storage device;

code to detect an input signal at the network interface device, the input signal corresponding to the message stored in the storage device and being input on the front panel of the peripheral device, the signal comprising a predetermined number of status chances effected over a predetermined period of time using the status button;

code to retrieve destination information for the message to the system administrator in response to detection of the input signal;

code to retrieve the message from the storage device in response to detection of the input signal;

code to form a notification packet including retrieved destination information, identification information regarding the peripheral device, and the message retrieved from the storage device; and code to transmit the notification packet to the system administrator using the retrieved destination information.

14. Computer-executable process steps according to claim 13, wherein the destination information includes data that corresponds to a network media access control (MAC) address for a computer used by the system administrator, and wherein the code to transmit the notification packet comprises code to transmit the notification packet to the system administrator's computer via the LAN.

15. Computer-executable process steps according to claim 13, wherein the input signal corresponds to a help request message, and wherein the code to form the notification packet includes code to retrieve the help request message from the storage device.

16. Computer-executable process steps according to claim 13, wherein the status button comprises an online/offline button which is used to place the peripheral device either online or offline.

17. Computer-executable process steps stored on a computer-readable medium, the computer executable process steps to notify a system administrator of a local area network (LAN) of a message using a status button on a front panel of a peripheral device interfaced to the LAN via a network interface device having a storage device, said computer-executable process steps comprising:

code to store a message to the system administrator in the storage device;

code to receive signals input on the front panel of the peripheral device at the network interface device, the signals comprising a predetermined number of status changes effected over a predetermined period of time by the status button;

code to analyze the received signals to detect a message signal corresponding to the message to the system administrator;

code to retrieve destination information for the message to the system administrator in response to detection of the message signal;

code to retrieve from the storage device the message that corresponds to the input signal;

code to form a notification packet including the retrieved destination information, identification information regarding the peripheral device, and the message corresponding to the message signal; and code to transmit the notification packet to the system administrator using the retrieved destination information.

18. Computer-executable process steps according to claim 17, wherein the destination information includes data corresponding to a network media access control (MAC) address for a computer used by the system administrator, and wherein the code to transmit the notification packet comprises code to transmit the notification packet to the system administrator's computer via the LAN.

19. Computer-executable process steps according to claim 17, wherein the message signal corresponds to a help request message stored in the storage device, wherein the code to analyze detects the message signal by recognizing the predetermined number of status changes within the predetermined time period, and wherein the code to form includes code to retrieve the prestored help request message from the storage device.

20. Computer-executable process steps according to claim 17, wherein the status button comprises an online/offline button which is used to place the peripheral device either online or offline.

21. A computer-readable medium which stores computer-executable process steps, the computer-executable process steps to transmit a message to a system administrator of a local area network (LAN) using a status button on a front panel of a peripheral device which is interfaced to the LAN via a network interface device having a storage device, the computer-executable process steps comprising:

a storing step to store a message to the system administrator in the storage device;

a detecting step to detect an input signal at the network interface device, the input signal corresponding to the message stored in the storage device and comprising a predetermined number of status changes effected within a predetermined period of time using the status button on the front panel of the peripheral device;

a retrieving step to retrieve destination information for the message to the system administrator in response to detection of the input signal;

a retrieving step to retrieve the message from the storage device in response to detection of the input signal;

a forming step to form a notification packet including retrieved destination information, identification information regarding the peripheral device, and the message retrieved from the storage device; and a second transmitting step to transmit the notification packet to the system administrator using the retrieved destination information.

22. A computer-readable medium according to claim 21, wherein the destination information includes data corresponding to a network media access control (MAC) address for a computer used by the system administrator, and wherein the second transmitting step comprises transmitting the notification packet to the system administrator's computer via the LAN.

23. A computer-readable medium according to claim 21, wherein the input signal corresponds to a help request message, and wherein the forming step includes retrieving the help request message from the storage device.

24. A computer-readable medium according claim 21, wherein the status button comprises an online/offline button which is used to place the peripheral device either online or offline.

25. A computer-readable medium which stores computer-executable process steps to notify a system administrator of a local area network (LAN) of a message using a status button on a front panel of a peripheral device interfaced to the LAN via a network interface device having a storage device, the computer-executable process steps comprising:

a storing step to store a message to the system administrator in the storage device;

a receiving step to receive signals input on the front panel of the peripheral device at the network interface device, the signals comprising a predetermined number of status changes effected over a predetermined period of time using the status button;

an analyzing step to analyze the received signals to detect a message signal corresponding to the message to the system administrator;

a retrieving step to retrieve destination information for the message to the system administrator in response to detection of the message signal;

a retrieving step to retrieve from the storage device the message that corresponds to the input signal;

a forming step to form a notification packet including the retrieved destination information, identification information regarding the peripheral device, and the message represented by the message signal; and a transmitting step to transmit the notification packet to the system administrator using the retrieved destination information.

26. A computer-readable medium according to claim 25, wherein the destination information includes data corresponding to a network media access control (MAC) address for a computer used by the system administrator, and wherein the transmitting step comprises transmitting the notification packet to the system administrator's computer via the LAN.

27. A computer-readable medium according to claim 25, wherein the message signal corresponds to a help request message, wherein the analyzing step detects the message signal by recognizing the predetermined number of status changes within the predetermined time period, and wherein the forming step includes retrieving the help request message from the storage device.

28. A method according to claim 1, further comprising storing a name of the system administrator in the storage device;

wherein the step of retrieving the destination information comprises retrieving the name of the system administrator from the storage device and retrieving address information for the system administrator from a remote storage location on the LAN based on the name of the system administrator retrieved from the storage device.

29. Computer executable process steps according to claim 13, further comprising code to store a name of the system administrator in the storage device;

wherein the code to retrieve the destination information comprises code to retrieve the name of the system administrator from the storage device and code to retrieve address information for the system administrator from a remote storage location on the LAN based on the name of the system administrator retrieved from the storage device.

30. A computer-readable medium according to claim 21, further comprising a storing step to store a name of the system administrator in the storage device;

wherein the step to retrieve the destination information comprises a step to retrieve the name of the system administrator from the storage device and a step to retrieve address information for the system administrator from a remote storage location on the LAN based on the name of the system administrator retrieved from the storage device.

31. A method according to claim 5, further comprising storing a name of the system administrator in the storage device;

wherein the step of retrieving the destination information comprises retrieving the name of the system administrator from the storage device and retrieving address information for the system administrator from a remote storage location on the LAN based on the name of the system administrator retrieved from the storage device.

32. Computer executable process steps according to claim 17, further comprising code to store a name of the system administrator in the storage device;

wherein the code to retrieve the destination information comprises code to retrieve the name of the system administrator from the storage device and code to retrieve address information for the system administrator from a remote storage location on the LAN based on the name of the system administrator retrieved from the storage device.

33. A computer-readable medium according to claim 25, further comprising a storing step to store a name of the system administrator in the storage device;

wherein the step to retrieve the destination information comprises a step to retrieve the name of the system administrator from the storage device and a step to retrieve address information for the system administrator from a remote storage location on the LAN based on the name of the system administrator retrieved from the storage device.

34. A network device according to claim 9, wherein the storage device stores a name of the system administrator; and wherein the processor retrieves the destination information by retrieving the name of the system administrator from the storage device and retrieving address information for the system administrator from a remote storage location on the LAN based on the name of the system administrator retrieved from the storage device.

35. A computer-readable medium according to claim 25, wherein the status button comprises an online/offline button which is used to place the peripheral device either online or offline.

36. An apparatus comprising:

a peripheral device having a front panel which includes a status button used to effect status changes in the peripheral device; and a network interface device, the network interface device interfacing the peripheral device to a network, the network interface device comprising:

a network interface for sending signals to and receiving signals from the network;

a peripheral interface for sending signals to and receiving signals from the peripheral device;

a storage device that stores a message to a system administrator; and a processor that (i) analyzes signals received from the front panel of the peripheral device via the peripheral interface to detect a message signal corresponding to the message to the system administrator, the message signal comprising a predetermined number of status changes effected over a predetermined period of time using the status button, (ii) retrieves the message to the system administrator from the storage device in response to detection of the message signal, (iii) retrieves destination information in response to the detection of the message signal, (iv) forms a notification packet including the retrieved destination information, identification information regarding the peripheral device, and the message corresponding to the message signal, and (v) transmits the notification packet to the system administrator over the network interface using the retrieved destination information.

37. An apparatus according to claim 36, wherein the status button comprises an online/offline button which is used to place the peripheral device either online or offline.

38. A network system comprising:

a computer for a system administrator, the computer being interfaced to a network;

a peripheral device having a front panel which includes a status button used to effect status chances in the peripheral device; and a network interface device which interfaces the peripheral device to the network, the network interface device comprising:

a network interface for sending signals to and receiving signals from the network;

a storage device that stores a message to the system administrator; and a processor that (i) analyzes signals received from the front panel of the peripheral device via the peripheral interface to detect a message signal corresponding to the message to the system administrator, the message signal comprising a predetermined number of status changes effected over a predetermined period of time using the status button, (ii) retrieves the message to the system administrator from the storage device in response to detection of the message signal, (iii) retrieves destination information in response to the detection of the message signal, (iv) forms a notification packet including the retrieved destination information, identification information regarding the peripheral device, and the message corresponding to the message signal, and (v) transmits the notification packet to the system administrator's computer over the network interface using the retrieved destination information.

39. A network system according to claim 38, wherein the status button comprises an online/offline button which is used to place the peripheral device either online or offline.

* * * * *